(12) United States Patent
Krasovic

(10) Patent No.: US 11,608,281 B2
(45) Date of Patent: Mar. 21, 2023

(54) METHOD OF OPERATING A WASTEWATER TREATMENT SYSTEM

(71) Applicant: Axine Water Technologies Inc., Vancouver (CA)

(72) Inventor: Julia Lynne Krasovic, Vancouver (CA)

(73) Assignee: Axine Water Technologies Inc., Vancouver (CA)

( * ) Notice: Subject to any disclaimer, the term of this patent is extended or adjusted under 35 U.S.C. 154(b) by 536 days.

(21) Appl. No.: 16/629,932

(22) PCT Filed: Jul. 12, 2018

(86) PCT No.: PCT/US2018/041856
§ 371 (c)(1),
(2) Date: Jan. 9, 2020

(87) PCT Pub. No.: WO2019/014467
PCT Pub. Date: Jan. 17, 2019

(65) Prior Publication Data
US 2020/0148559 A1 May 14, 2020

Related U.S. Application Data

(60) Provisional application No. 62/531,539, filed on Jul. 12, 2017.

(51) Int. Cl.
*C02F 1/467* (2006.01)
*C02F 1/461* (2006.01)
(Continued)

(52) U.S. Cl.
CPC ............ *C02F 1/4672* (2013.01); *C02F 1/004* (2013.01); *C02F 1/46109* (2013.01); *C25B 9/19* (2021.01);
(Continued)

(58) Field of Classification Search
CPC .............. C02F 2201/4613; C02F 2201/46135
See application file for complete search history.

(56) References Cited

U.S. PATENT DOCUMENTS 4,087,337 A 5/1978 Bennett
4,308,122 A 12/1981 Das Gupta et al.
(Continued)

OTHER PUBLICATIONS

Elnathan, "The Effect of Current Reversal on Coated Titanium Electrodes", The University of Utah, May 2012, 96 pages.

*Primary Examiner* — Ciel P Contreras
(74) *Attorney, Agent, or Firm* — Seed IP Law Group LLP

(57) ABSTRACT

A method for operating a wastewater treatment system is disclosed wherein the wastewater treatment system comprises at least one electrochemical cell comprising dimensionally stable electrodes having the same catalyst composition, the electrodes being immersed in wastewater and being connected to a power supply and wherein the voltage at the power supply is monitored and the polarity of the electrochemical cell(s) is reversed when the recorded voltage increases by a predetermined voltage difference. The wastewater treatment system can comprise at least one electrochemical cell which is kept inactive while the active electrochemical cells are operating. The inactive cell(s) can be activated when all the electrodes of the active cells are consumed as indicated by another increase in voltage at the power supply after the polarity of the active cells has been once reversed.

6 Claims, 3 Drawing Sheets

(51) Int. Cl.
    *C25B 15/02*  (2021.01)
    *C02F 1/00*  (2023.01)
    *C25B 13/08*  (2006.01)
    *C25B 9/19*  (2021.01)
    *C25B 9/70*  (2021.01)
    *C25B 11/051*  (2021.01)
    *C02F 101/10*  (2006.01)

(52) U.S. Cl.
    CPC .............. *C25B 9/70* (2021.01); *C25B 11/051* (2021.01); *C25B 13/08* (2013.01); *C25B 15/02* (2013.01); *C02F 2001/46142* (2013.01); *C02F 2001/46157* (2013.01); *C02F 2101/10* (2013.01); *C02F 2201/4613* (2013.01); *C02F 2201/46115* (2013.01); *C02F 2201/46135* (2013.01)

(56) References Cited

U.S. PATENT DOCUMENTS

| | | |
|---|---|---|
| 2008/0290546 A1 | 11/2008 | Andelman et al. |
| 2009/0229992 A1 | 9/2009 | Sanchez et al. |
| 2009/0321251 A1 | 12/2009 | Rigby |
| 2011/0025306 A1 | 2/2011 | Ackerman et al. |

METHOD OF OPERATING A WASTEWATER TREATMENT SYSTEM

TECHNICAL FIELD

The present invention relates to a method of operating a wastewater treatment system to increase the system's operation time without having to replace the electrodes.

BACKGROUND

There is a substantial demand for new wastewater treatment systems due to the population growth and increased volumes of wastewater produced, tighter wastewater quality regulations, increasing cost of clean water and water shortages, awareness for the protection of clean water sources and replacement of aging wastewater treatment infrastructure. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The requirement is for cost-effective, sustainable water treatment systems that do not require the addition of chemicals and do not produce secondary pollution, are compliant with stringent water quality standards, and have minimal operational and maintenance requirements.

Industrial wastewater can contain organic compounds, many of which are toxic, persistent and resist conventional biological and chemical wastewater treatment. The preferred approach to treat recalcitrant wastewater is by non-chemical oxidation techniques that can mineralize the pollutants and reduce the organic load and toxicity of the waste, such as electrochemical oxidation. Electrochemical oxidation is sustainable, safe and has a high treatment efficacy eliminating a wide variety of pollutants such as persistent organic pollutants, dioxins, nitrogen species (e.g. ammonia), pharmaceuticals, pathogens, microorganisms, a majority of priority pollutants and pesticides. Within the area of electrochemical treatment of wastewater there are two primary approaches for the oxidation of pollutants in wastewater. The first method is the direct electrochemical oxidation of organic and/or inorganic pollutants directly on the anode surface. The second method is indirect electrochemical oxidation of organic and/or inorganic pollutants through the in-situ generation of chemically oxidizing species (such as hydroxyl, chlorine, oxygen or perchlorate radicals or compounds such as hypochlorite, ozone, or hydrogen peroxide). These chemically oxidizing species are generated directly on the anode surface and subsequently oxidize pollutants within the wastewater solution.

A variety of cell configurations that include flow-through parallel plates separated by a gap or by a membrane, stacked discs, concentric cylinders, moving bed electrodes and filter-press have been developed for the direct and indirect electrochemical oxidation of wastewater. Electrochemical cells, having an anode and a cathode separated by a membrane and two flow field plates with one flow field plate feeding the wastewater to the anode, have also been employed for treating wastewater. However, common to all these electrochemical cell configurations is a relative short lifetime of the electrodes and an increased cost of the system caused by the need to replace the consumed electrodes.

In systems employing electrochemical oxidation for treating wastewater, the anode catalyst can be platinum, ruthenium oxide (RuOx), iridium oxide (IrOx), diamond, boron-doped diamond etc. and the cathode catalyst can be the same as the anode catalyst if both the anode and the cathode are immersed in a tank where they are exposed to the wastewater to be treated. In other systems, for example in systems having electrochemical cells where the anode and the cathode are separated by a membrane and flow field plates are feeding the wastewater to the anode, the cathode catalyst can be different than the anode catalyst mentioned above, for example the cathode can be Ni, stainless steel, Ti, NiCoLaOx etc.

In systems employing electrochemical oxidation for treating wastewater, the anode is not physically consumed and therefore it is a dimensionally stable anode (DSA). This is different than other water treatment methods (e.g. electrocoagulation, flocculation) where ions of anode material are released from the anode and therefore the electrodes are physically consumed during the cell operation. In such cases, a new electrode has to be installed after a period of time in the empty place left by the consumed electrode. Such electrodes are referred to as "sacrificial" electrodes. In such systems, the polarity of the electrodes can be periodically reversed to provide a desired anode/cathode surface ratio and an even wear on electrodes, as described for example in the U.S. Pat. No. 9,540,258 or in the U.S. Patent Application No. 2009/0008269. This is achieved, for example, by having the cathode play the role of the anode for a determined amount of time and then switching it back to being a cathode again, once the anode/cathode surface ratio is re-established, as described in U.S. Pat. No. 9,540,258. This results in the anode and cathode being physically consumed substantially at the same pace.

In water treatment systems which employ dimensionally stable electrodes, the electrodes do not physically lose any material, but electrode fouling can take place and in such cases occasional cleanup of the electrodes may be accomplished by temporary/periodic cell reversals. For example, U.S. Patent Application No. 2002/0139689 describes an electrolytic cell for producing sodium hypochlorite, which is used for water or sewage treatment, the electrolytic cell comprising an electrode with a coating composed of a mixture of iridium oxide and a platinum group metal and a binder, preferably titanium oxide, whereby the dissolved polyvalent metal ions in the hard water can be deposited on the electrode surface and can interfere with the electrochemical reaction. As described in this prior art document, a technique of reversing the polarity of the applied voltage is used to extend the operating life of the electrodes, whereby the reverse polarity operation of the electrolytic cell at a lower current density is used to clean or remove any scale precipitated on the electrodes.

In another example, U.S. patent application 2014/0174942 illustrates a system for on-site generation of oxidants such as hypochlorite comprising a conductive diamond anode and a cathode, and describes that the polarity of the electrodes may be reversed for short periods of time to help remove mineral buildup/scale for reactivating the electrodes. This prior art document states that systems using dimensionally stable electrodes comprising conductive oxides such as oxides of ruthenium or iridium, tend to break down under reverse polarity causing the electrode to disintegrate prematurely which shortens the electrode lifetime and reliability. It further states that stainless steel cathodes are susceptible to oxidation (rusting) if operated in reverse polarity. To prevent this, the system uses conductive diamond anodes and cathodes, preferably comprising one of conductive diamond, tungsten, graphite, stainless steel, zirconium or titanium.

As further mentioned in applicant's U.S. Pat. No. 9,440, 866, model wastewater can be treated without fouling the cell electrodes because the oxygen evolution on the anode side due to water electrolysis as a side reaction can help keep the electrode free from any organic buildup. However, it is generally known in the art to perform an occasional cleanup of the electrodes by temporary cell reversals.

In the case of the dimensionally stable electrodes used in the wastewater treatment systems, for example for electrodes coated with IrOx, RuOx, Pt, Pt black, diamond (e.g. boron-doped diamond), etc., the catalyst can gradually lose its active properties, for example, its electrocatalytic properties (it can become passive) and when the electrode is entirely passivated it needs to be replaced which can be a complex and expensive process.

Therefore, there is a need in the wastewater treatment industry to increase the continuous operation time of the wastewater treatment systems using dimensionally stable electrodes without having to replace the passivated electrodes.

SUMMARY OF THE INVENTION

The present invention describes a method for treating wastewater comprising the steps of:

a. providing a wastewater treatment system comprising at least one electrochemical cell comprising dimensionally stable electrodes having the same catalyst composition, the electrodes being immersed in wastewater, b. providing power to the electrochemical cell from a power supply, c. operating the electrochemical cell at a predetermined current density and at a predetermined voltage to thereby degrade the pollutant in the wastewater, d. monitoring the voltage at the power supply, e. reversing the polarity of the electrochemical cell when the voltage at the power supply becomes higher than the predetermined voltage by a predetermined voltage difference, and f. continuing to operate the electrochemical cell with reversed polarity until inactivated.

In the present described method the predetermined voltage difference is preferably between 2 to 3 volts.

In preferred embodiments, the method further comprises the step of filtering the wastewater to be treated before the wastewater is delivered to the electrochemical cell to be treated, to separate the metallic compounds from the wastewater. This prevents the deposition of such metallic compounds on the electrodes during the electrochemical cell operation.

Another embodiment of the present method comprises the steps of:

a. providing a wastewater treatment system comprising at least one active electrochemical cell and at least one inactive electrochemical cell, each active and inactive electrochemical cell comprising dimensionally stable electrodes having the same catalyst composition, the electrodes being immersed in wastewater, b. providing power to the active electrochemical cell from a power supply, c. operating the active electrochemical cell at a predetermined current density and at a predetermined voltage to thereby degrade a targeted pollutant in the wastewater, d. monitoring the voltage at the power supply, e. reversing the polarity of the electrochemical cell when the voltage at the power supply becomes higher than the predetermined voltage by a predetermined voltage difference, f. continuing to monitor the voltage at the power supply after the polarity reversal, and g. activating at least one inactive cell when the voltage at the power supply becomes higher than the predetermined voltage by the predetermined voltage difference.

In this method the predetermined voltage difference is preferably between 2 to 3 volts. Such method can also comprise the step of filtering the wastewater to be treated to separate the metallic compounds from the wastewater.

The present invention also refers to a system for the treatment of wastewater comprising at least one active electrochemical cell comprising a dimensionally stable anode and a dimensionally stable cathode, separated by a gap, and immersed in the wastewater to be treated, a power supply for supplying power to the electrochemical cell such that it operates at a predetermined current and at a predetermined voltage to thereby degrade a targeted pollutant in the wastewater, a voltmeter for monitoring the voltage at the power supply, and a system controller for commanding the reversal of the polarity of the active electrochemical cell when the monitored voltage at the power supply becomes higher than the predetermined voltage by a first predetermined voltage difference. The predetermined voltage difference is preferably between 2 to 3 volts.

The dimensionally stable anode comprises an anode support and an anode catalyst layer deposited thereon and the dimensionally stable cathode comprises a cathode support and a cathode catalyst layer deposited thereon, the anode catalyst layer and the cathode catalyst layer having the same composition. The anode support and/or the cathode support can have the shape of a plate or of a mesh. The anode catalyst and the cathode catalyst is selected from the group comprising ruthenium oxide (RuOx), iridium oxide (IrOx), ruthenium iridium oxide (RuIrOx), iridium tantalum oxide (IrTaOx), ruthenium tantalum oxide (RuTaOx), iridium ruthenium titanium tantalum oxide (IrRuTiTaOx), platinum, platinum black, diamond and boron-doped diamond.

The material of the anode support and of the cathode support is selected from a group comprising titanium, nickel, cerium and steel.

In some embodiments, a solid polymer membrane electrolyte is interposed between the anode and the cathode.

In preferred embodiments, the system further comprises at least one inactive electrochemical cell comprising a dimensionally stable anode and a dimensionally stable cathode, separated by a gap, immersed in the wastewater to be treated, the inactive electrochemical cell being activated by the system controller when the monitored voltage at the power supply becomes higher than the predetermined voltage by the predetermined voltage difference of preferably between 2 and 3 volts.

The inactive electrochemical cell in this embodiment can have the same configuration and materials as the active electrochemical cell.

In some embodiments, the inactive electrochemical cell can comprise a solid polymer membrane electrolyte interposed between the anode and the cathode, occupying the gaps between them.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein SPE stands for solid polymer electrolyte and can be any suitable ion conducting ionomer (either of anion or cation, organic or inorganic form), such as Nafion®. A SPE electrochemical cell is thus a cell comprising a SPE as the electrolyte to which electrical energy is supplied to effect a desired electrochemical reaction (with a positive voltage being applied to the anode of the cell).

Figure 1:
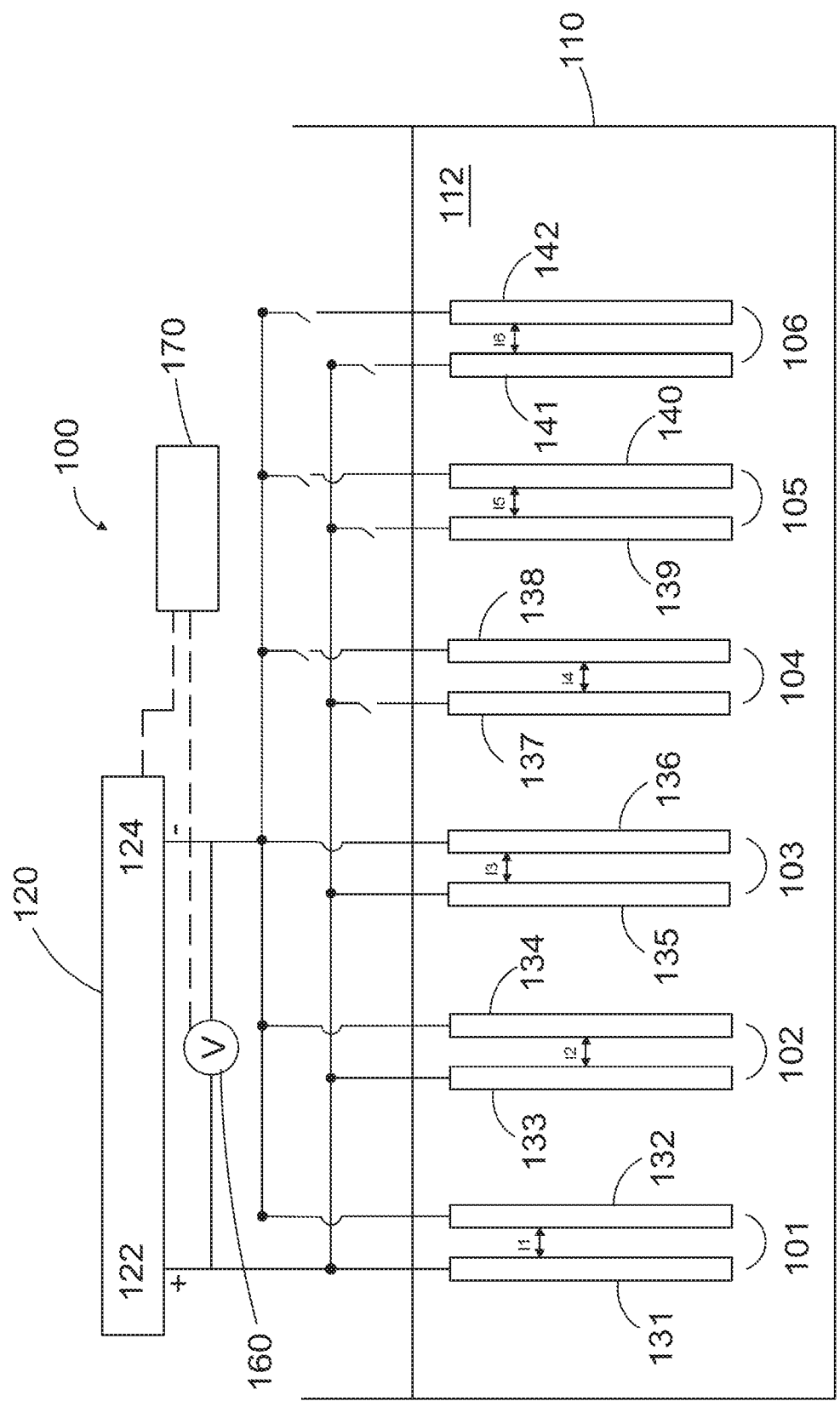
FIG. 1 illustrates a schematic view of a wastewater treatment system according to the present invention.

An exemplary system for wastewater treatment according to the present invention is illustrated schematically in FIG. 1. System 100 comprises a plurality of electrochemical cells 101, 102, 103, 104, 105 and 106 immersed in a reactor tank 110 which contains the wastewater 112 to be treated. Each electrochemical cell comprises an anode and a cathode. Some of the electrochemical cells in the system are active, for example cells 101, 102 and 103 and have their anodes 131, 133 and 135 connected to the positive output 122 of the DC power supply 120 and their cathodes 132, 134 and 136 connected to the negative output 124 of the DC power supply 120.

Electrochemical cells 104, 105 and 106 are kept inactive at this stage, and their anodes 137, 139 and 141 and cathodes 138, 140 and 142 are disconnected from the DC power supply 120.

The wastewater to be treated 112 is supplied to the reactor tank 110 such that the electrochemical cells are immersed in wastewater which surrounds the anodes and cathodes and occupies the gaps 11, 12, 13, 14, 15 and 16 between the anodes and cathodes. Such gaps are generally small, for example between 2 and 4 mm. In some embodiments a solid polymer membrane is placed between the anode and cathode of each cell as further illustrated in FIGS. 3A and 3B.

Due to the connection of electrochemical cells 101, 102 and 103 to the DC power supply, electrochemical reactions take place at the anode and at the cathode of each electrochemical cell, leading to the treatment of wastewater to obtain clean treated water. Such electrochemical reactions are known to those skilled in the art.

For example, the chemical reactions involved at the anode can include:

Direct electrolysis of an organic compound R by electron transfer:

$$R \rightarrow P + e^-$$

For the mineralization of organic compounds, R, through oxygen transfer from water and evolved oxygen:

$$R + \frac{n}{2}H_2O \rightarrow \text{mineralization products [CO}_2 + \text{salts, etc.]} + nH^+ + ne^-$$

$$2H_2O \rightarrow O_2 + 4H^+ + 4e^-$$

$$R + \frac{n}{4}O_2 \rightarrow \text{mineralization products [CO}_2 + \text{salts, etc.]} + nH^+ + ne^-$$

For hydroxyl and oxygen radicals, and intermediates of $O_2$ evolution on a catalyst surface:

$$H_2O \rightarrow OH^*_{ads} + H^+ + e^-$$

$$(h^+)_{vac} + H_2O \rightarrow (OH^*)_{ads} + H^+ + e^-$$

$$R + [OH^* \text{radicals}/O^* \text{species/intermediates}]_{ads} \rightarrow \text{mineralization products}[CO_2 + \text{salts, etc.}] + nH^+ + ne^-$$

For the oxidation of ammonia $$4NH_3 + 3O_2 \rightarrow 2N_2 + 6H_2O$$

$$NH_3/NH_4 + OH^* \rightarrow N_2 + H_2O + H^+ + e^-, \text{ and}$$

if the wastewater is alkaline, removal via free chlorine $$HOCl + \frac{2}{3}NH_3 \rightarrow \frac{1}{3}N_2 + H_2O + H^+ + Cl^-$$

$$NH_3/NH_4 + HOCl/OCl^- \rightarrow N_2 + H_2O + H^+ + Cl^-$$

For the formation of inorganic oxidants, e.g.:

$$2CO_3^{2-} \rightarrow C_2O_6^{2-} + 2e^-$$

$$2PO_4^{3-} \rightarrow P_2O_8^{4-} + 2e^-$$

$$2HSO_4^- \rightarrow S_2O_8^{2-} + 2H^+ + 2e^-$$

For the generation of oxidants in-situ, e.g. NaCl in wastewater:

$$2Cl^- \rightarrow Cl_2 + 2e^-$$

$$\frac{1}{2}Cl_2 + H_2O \rightarrow HOCl + H^+ + Cl^-$$

$$HOCl \rightarrow H^+ + OCl^-$$

For $H_2S$:

$$H_2S \rightarrow S^0 + 2H^+ + 2e^-$$

And if the wastewater is alkaline, via electrochemical deposition a pH control apparatus may be employed to facilitate alkaline decomposition.

For metal ions [e.g. transition metal ions such as iron, manganese]:

oxidization via hydroxyl radicals and oxygen oxidation via hydroxyl radicals, e.g. $Mn + OH^* \rightarrow Mn^{-1} + OH^-$ or oxidation with oxygen, e.g.

$$2Fe^{2+} + \frac{1}{2}O_2 + 5H_2O \rightarrow 2Fe(OH)_3 \downarrow + 4H^+$$

$$Mn^{2+} + \frac{1}{2}O_2 + H_2O \rightarrow MnO_2 \downarrow + 2H^+$$

For such purposes, oxygen generating electrocatalysts may desirably be incorporated into a catalyst layer deposited on a fluid diffusion layer. Further, the residence time of wastewater in contact with the catalyst layer may be increased to complete oxidation. Preferably, a filter may be employed in the system to remove the metallic compounds from the wastewater before it is treated.

For catalytic decomposition:

$$H_2O_2 \rightarrow H_2O + \frac{1}{2}O_2$$

Pollutant specific decomposition and oxidation catalysts may be desirably incorporated into the anode fluid diffusion layer and anode catalyst layer. These can provide for the decomposition and/or oxidation of the pollutants at lower voltage, higher flow rates and lower energy consumption.

For pollutants that oxidize and/or decompose into gases, one or more degas units or methods may be employed in the system to remove resulting product gases.

Meanwhile at the cathode, hydrogen evolution occurs as:

$$nH^+ + ne^- \rightarrow \frac{n}{2}H_2(g)$$

Figure 2:
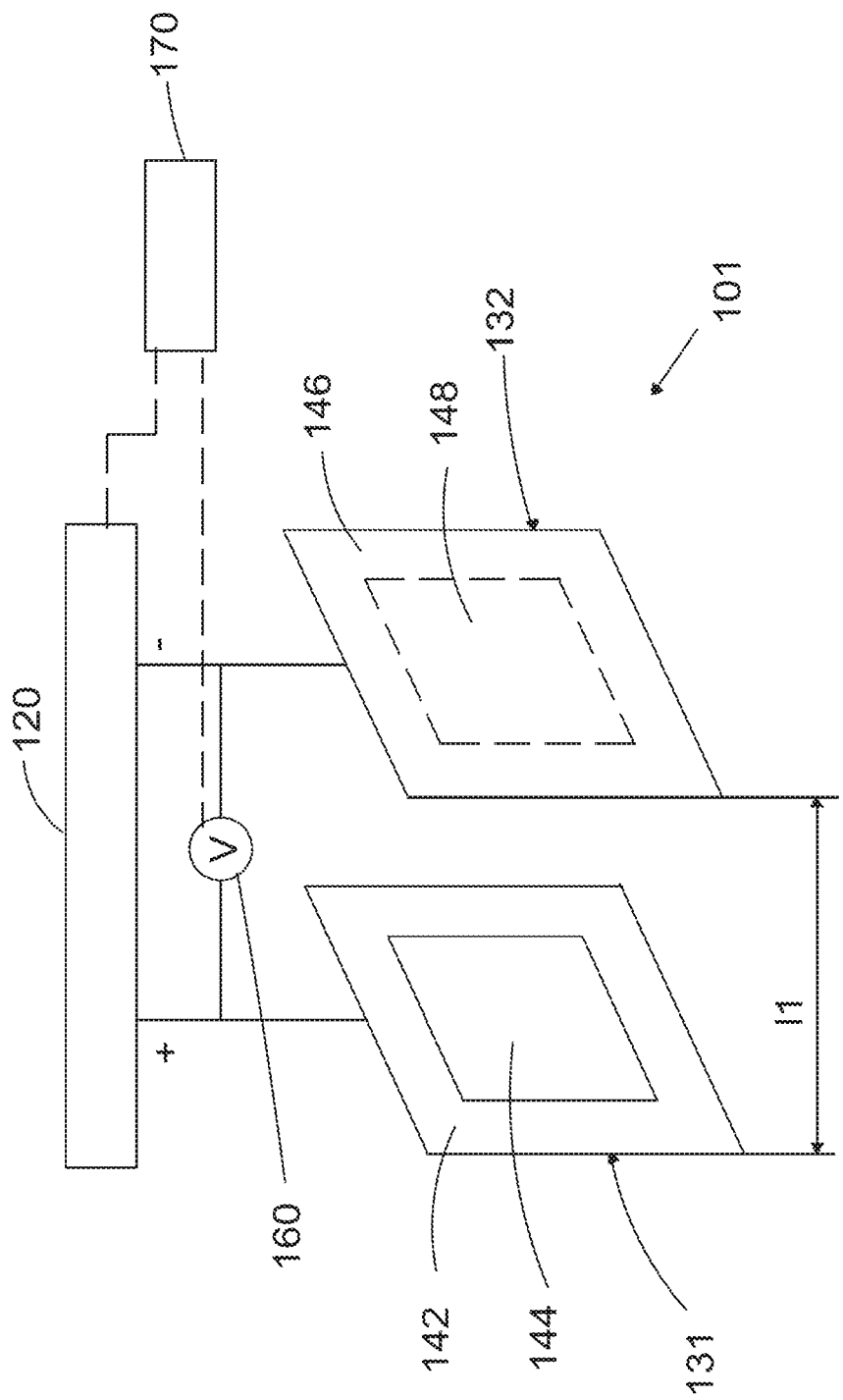
FIG. 2 shows a schematic view of an embodiment of an electrochemical cell of the system illustrated in FIG. 1.

One electrochemical cell 101 of the system illustrated in FIG. 1 is schematically illustrated in FIG. 2. Electrochemical cell 101 comprises an anode 131 consisting of an anode support 142 and an anode catalyst layer 144 deposited on the anode support and a cathode 132 consisting of a cathode support 146 and a cathode catalyst layer 148 deposited on the cathode support.

The anode catalyst layer in the present invention has the same composition as the cathode catalyst layer, meaning that the catalyst composition is selected such that the catalyst can work both as an anode and as a cathode. Platinum (Pt), platinum black, ruthenium oxide (RuOx), iridium oxide (IrOx), ruthenium-iridium oxide (RuIrOx), iridium-tantalum oxide (IrTaOx), ruthenium-tantalum oxide (RuTaOx), iridium-ruthenium-titanium-tantalum oxide (IrRuTiTaOx) can be used in the present invention as the anode and the cathode catalyst. In some embodiments, the anode and the cathode are diamond electrodes, for example boron-doped diamond electrodes.

The anode catalyst and respectively the cathode catalyst are dimensionally stable and are not physically consumed during the electro-oxidation process taking place in the reactor tank.

Figure 3:
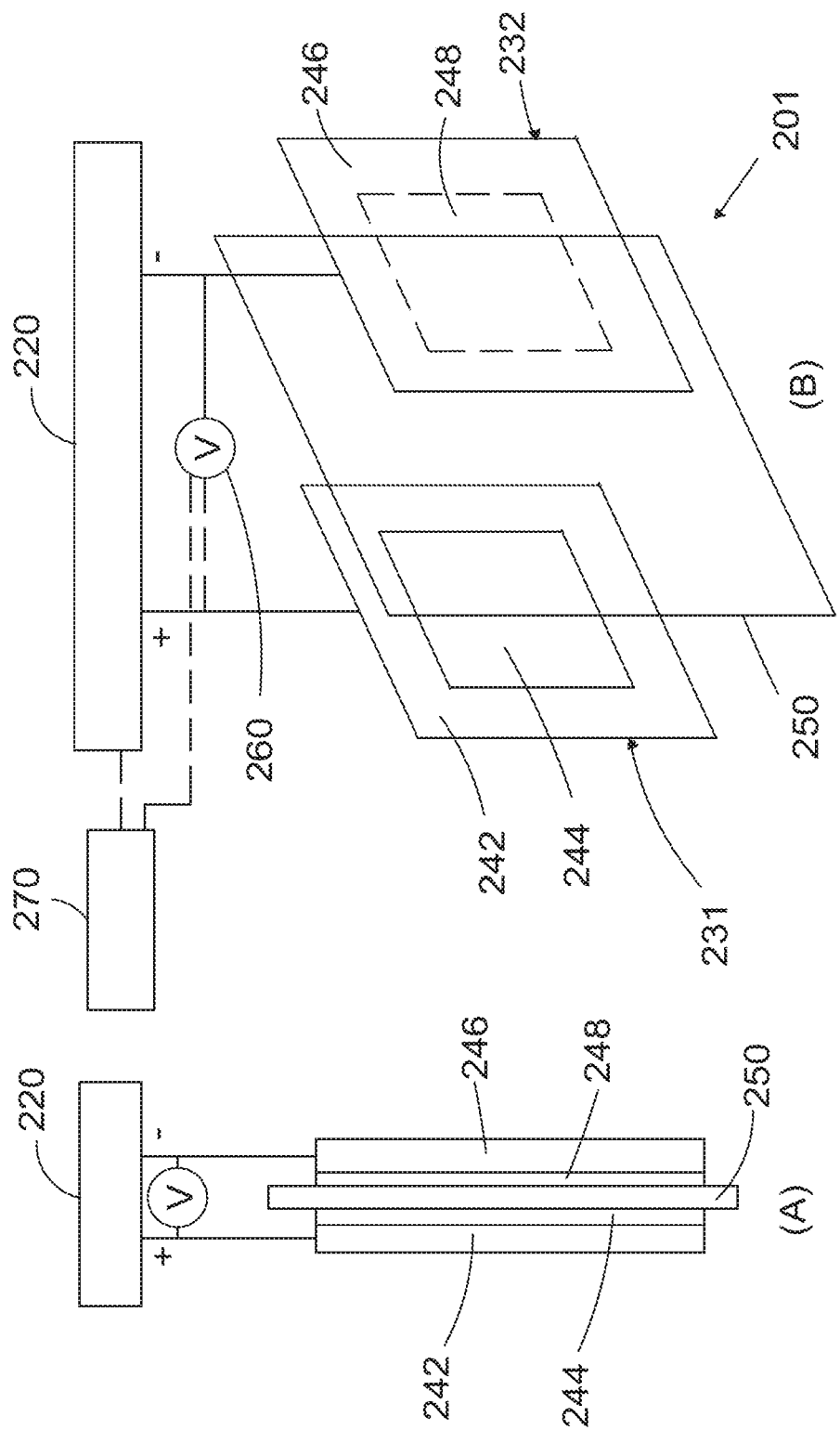
FIGS. 3A and 3B illustrate a schematic view and an exploded view of another embodiment of an electrochemical cell of the system illustrated in FIG. 1.

Another embodiment of the electrochemical cell that can be used in the present invention is illustrated in FIG. 3. Electrochemical cell 201 comprises an anode 231 consisting of an anode support 242 and an anode catalyst layer 244 deposited on the anode support and a cathode 232 consisting of a cathode support 246 and a cathode catalyst layer 248 deposited on the cathode support. The electrochemical cell further comprises a solid polymer electrolyte (SPE), in the shape of a membrane 250 which is interposed between the anode and the cathode such that there is no gap between anode catalyst layer 244 and the membrane 250 and respectively between the cathode catalyst layer 248 and the membrane 250.

In the embodiments of the present system illustrated in FIGS. 1 to 3, the electrodes are immersed in an open reactor tank being surrounded by wastewater. In alternative embodiments, the electrodes can be placed in a closed enclosure to which wastewater to be treated is fed through an inlet and clean water is collected at the outlet of the enclosure. In alternative embodiments, wastewater can be fed to an enclosure such that the electrodes placed in the enclosure are immersed in wastewater and a partially cleaned wastewater exits the enclosure and is fed back to the enclosure for further treatment in what is known as a flow-through reactor design. In all the embodiments disclosed in the present invention, the electrodes are immersed in the wastewater to be treated. This is different than some electrochemical cells from the prior art where wastewater is fed to the anode catalyst through channels in a flow field plate which is placed next to the anode.

The operation of the water treatment system illustrated in FIG. 1 according to the present invention will now be explained. During operation, the anode catalyst enables the electro-oxidation reactions for treating the wastewater in the tank and can become catalytically consumed over time, while the cathode catalyst is catalytically protected, due to the nature of the reactions taking place at the cathode, and is not consumed. When the anode catalyst layer is completely consumed, the voltage at the power supply, which is monitored by voltmeter 160, records a 2 to 3 V increase over the normal operation voltage. This signals the anode failure of at least one active electrochemical cell and is communicated to the system controller 170 which commands reversing the polarity of the active electrochemical cells so that their cathodes are connected now to the positive charge and operate as anodes, while the anodes are connected to the negative charge of the power supply and operate as cathodes. This switch is possible because the anode and the cathode of each electrochemical cell have the same catalyst and because the anode support in each electrochemical cell (e.g. 142) remains intact after the anode catalyst consumption and can function as a cathode when the electrochemical cell polarity is reversed.

The electrochemical cell illustrated in FIG. 3 which is connected to DC power supply 220 operates in the same way, system controller 270 reversing the cell polarity when voltmeter 260 indicates a 2 to 3 V increase over the normal operation voltage.

This method of operation offers real advantages in increasing the operation time of the electrochemical cell without having to replace the consumed electrodes. Depending on the operating conditions, the type of wastewater being treated and the type of electrodes being used, this method can almost double the lifetime of an electrochemical cell in the system.

For example, for a system which operates at a pH of between 0 and 14, at a current density between 50 to 400 mA/cm2 and at a temperature between 20 and 80 degrees C., having electrochemical cells with a gap between the anode and electrode of between 2 to 4 mm, or separated by an SPE such as a Nafion 115 membrane, where the lifetime of an electrochemical cell operating according to a conventional operation method is between 2 to 24 months, in a system operating according to the present method, each electrochemical cell would operate between 4 to 48 months without having to have any electrodes replaced.

The present system also comprises some electrochemical cells 104, 105 and 106 which are kept inactive at the beginning of the system's operation. The method of operating the system comprises the step of activating at least one of the inactive cells when the voltmeter records a voltage increase of between 2 to 3 V after the polarity of the active cells was already once reversed, indicating that the catalysts of both the electrodes of at least one electrochemical cell from the active cells pack are now catalytically consumed (passivated).

By activating some previously inactive cells in the system, the system's continuous operation time can be further increased beyond double the time of a normal operation.

In preferred embodiments, the wastewater to be treated does not contain certain contaminants, for example, iron, magnesium or calcium, which can generally clog the electrodes. In the prior art, such contaminants which adhere to the electrode surface, are removed by periodic reversal of the electrochemical cell's polarity, but, as recognized in the prior art, for certain catalysts the periodic cell reversal can damage the catalysts making them inoperative. In preferred embodiments of the present method, such contaminants are filtered before the wastewater is supplied to the reactor tank of the wastewater treatment system to be treated.

In the present wastewater treatment the gaps 11, 12, 13, 1, 15 and 16 between the anode and cathode of each electrochemical cell can be the same or can be different. Furthermore, the anode support and the cathode support of each of the electrochemical cells can be a solid plate or it can be a mesh, as disclosed for example in the applicant's U.S. patent application No. 62/279,631. The material of the solid plate or of the mesh which serves an anode or a cathode support is selected from a group comprising titanium, nickel, cerium and steel.

The advantage of the present invention compared to the solutions from the prior art consists in switching the polarity of the electrochemical cell when the voltage rise indicates that the anode catalyst is passivated and then continuing to operate the cathode as the anode of the cell without switching back to the previous operation mode. This is different than the methods of operating electrochemical cells having dimensionally stable electrodes from the prior art which periodically reverse the polarity of the cell only for short periods of time.

The disclosure of U.S. provisional patent application Ser. No. 62/531,539, filed Jul. 12, 2017, is incorporated herein in its entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A method for treating wastewater comprising the steps of:
   a. providing a wastewater treatment system comprising at least one electrochemical cell comprising dimensionally stable electrodes having the same catalyst composition, the electrodes being immersed in wastewater,
   b providing power to the electrochemical cell from a power supply,
   c. operating the electrochemical cell at a predetermined current density and at a predetermined voltage to thereby degrade the pollutant in the wastewater,
   d. monitoring the voltage at the power supply,
   e. reversing the polarity of the electrochemical cell when the voltage at the power supply becomes higher than the predetermined voltage by a predetermined voltage difference, and
   f. continuing to operate the electrochemical cell with reversed polarity until the voltage at the power supply becomes again higher than the predetermined voltage by the predetermined voltage difference, at which time the electrochemical cell is inactivated.

2. The method of claim 1 wherein the predetermined voltage difference is between 2 to 3 volts.

3. A method of claim 1 further comprising the step of filtering the wastewater to be treated to separate the metallic compounds from the wastewater.

4. A method for treating wastewater comprising the steps of:
   a. providing a wastewater treatment system comprising at least one active electrochemical cell and at least one inactive electrochemical cell, each active and inactive electrochemical cell comprising dimensionally stable electrodes having the same catalyst composition, the electrodes being immersed in wastewater,
   b. providing power to the active electrochemical cell from a power supply,
   c. operating the active electrochemical cell at a predetermined current density and at a predetermined voltage to thereby degrade a targeted pollutant in the wastewater,
   d. monitoring the voltage at the power supply,
   e. reversing the polarity of the electrochemical cell when the voltage at the power supply becomes higher than the predetermined voltage by a predetermined voltage difference,
   f. continuing to monitor the voltage at the power supply after reversing the cell polarity, and
   g. activating at least one inactive cell that was not used before for treating wastewater when the voltage at the power supply becomes again higher than the predetermined voltage by the predetermined voltage difference.

5. The method of claim 4 wherein the predetermined voltage difference is between 2 to 3 volts.

6. A method of claim 4 further comprising the step of filtering the wastewater to be treated to separate the metallic compounds from the wastewater.

* * * * *